United States Patent [19]

Currah

[11] 4,181,241

[45] Jan. 1, 1980

[54] APPARATUS FOR DISPENSING SEEDS FROM LIQUID SUSPENSION

[75] Inventor: Ian E. Currah, Stratford-upon-Avon, England

[73] Assignee: National Research Development Corporation, London, England

[21] Appl. No.: 898,674

[22] Filed: Apr. 21, 1978

Related U.S. Application Data

[63] Continuation of Ser. No. 730,284, Oct. 6, 1976.

[30] Foreign Application Priority Data

Oct. 8, 1975 [GB] United Kingdom ............... 41220/75

[51] Int. Cl.² .............................................. A01C 7/18
[52] U.S. Cl. ...................................... 221/211; 111/1; 111/7; 111/80; 221/278
[58] Field of Search ................. 111/1, 7, 80; 221/211, 221/278; 222/193, 194

[56] References Cited

U.S. PATENT DOCUMENTS

| | | |
|---|---|---|
| 1,160,278 | 11/1915 | Gray et al. |
| 1,386,105 | 8/1921 | Gray . |
| 2,737,314 | 3/1956 | Anderson .......................... 221/211 X |
| 3,240,175 | 3/1966 | Clow . |
| 3,322,080 | 5/1967 | Gatzke et al. ............................ 111/1 |
| 3,445,981 | 5/1969 | Hori . |
| 3,450,074 | 6/1969 | Gatzke et al. ........................ 111/7 X |
| 3,511,016 | 5/1970 | Craig . |
| 3,638,393 | 2/1972 | Datta . |
| 3,770,164 | 11/1973 | Hembree . |

FOREIGN PATENT DOCUMENTS 986964 3/1965 United Kingdom .
1045732 10/1966 United Kingdom .
1330198 9/1973 United Kingdom .

Primary Examiner—David A. Scherbel
Attorney, Agent, or Firm—Oblon, Fisher, Spivak, McClelland & Maier

[57] ABSTRACT

Apparatus for dispensing discrete objects, such as seeds from a liquid, comprises a suspension container for containing seeds in suspension in the liquid, and a capture element defining a capture orifice allowing exit of liquid from the container and adapted to capture a number of the seeds against the orifice by providing a pressure difference across the orifice. Relative movement is produced between the capture orifice and the objects in suspension in the liquid in such a manner as to have the capture orifice, after capture of seeds, situated in a region free from seeds suspended in liquid, and a flow of liquid is produced past the capture orifice such as to sweep away excess seeds attracted to the capture orifice by the pressure difference. A system is provided for moving a seed, usually a single seed, from the capture orifice at a required region for dispensing the seed. Preferably the capture orifice is arranged to be submerged in liquid throughout normal operation, and there are provided an outlet port for the exit of capture seeds and an inflow system for providing an inflow of liquid through the outlet port into the container sufficient to prevent random escape of seeds through the outlet port. The relative movement is accomplished by moving the capture orifice relative to the container or by producing a flow of liquid in the container to produce such relative movement between the capture orifice and the seeds in suspension by moving the seeds relative to the container.

34 Claims, 21 Drawing Figures

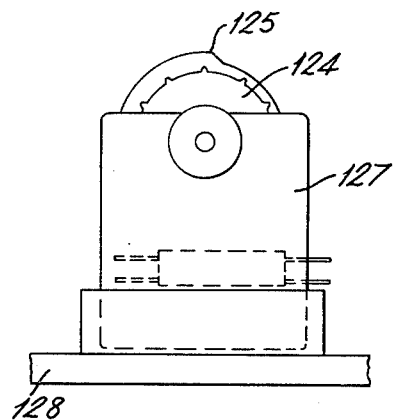
Fig. 10
Fig. 11
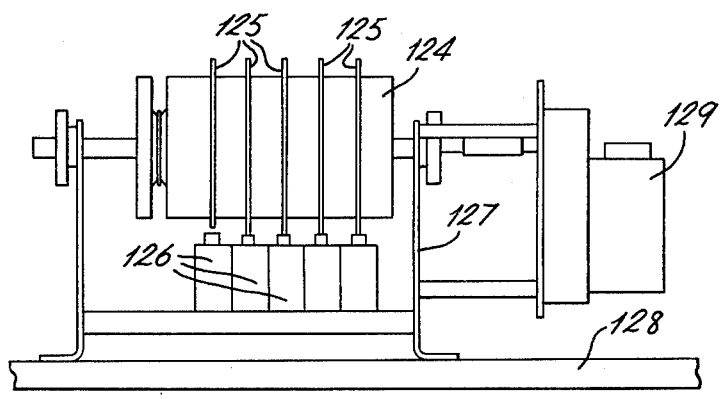

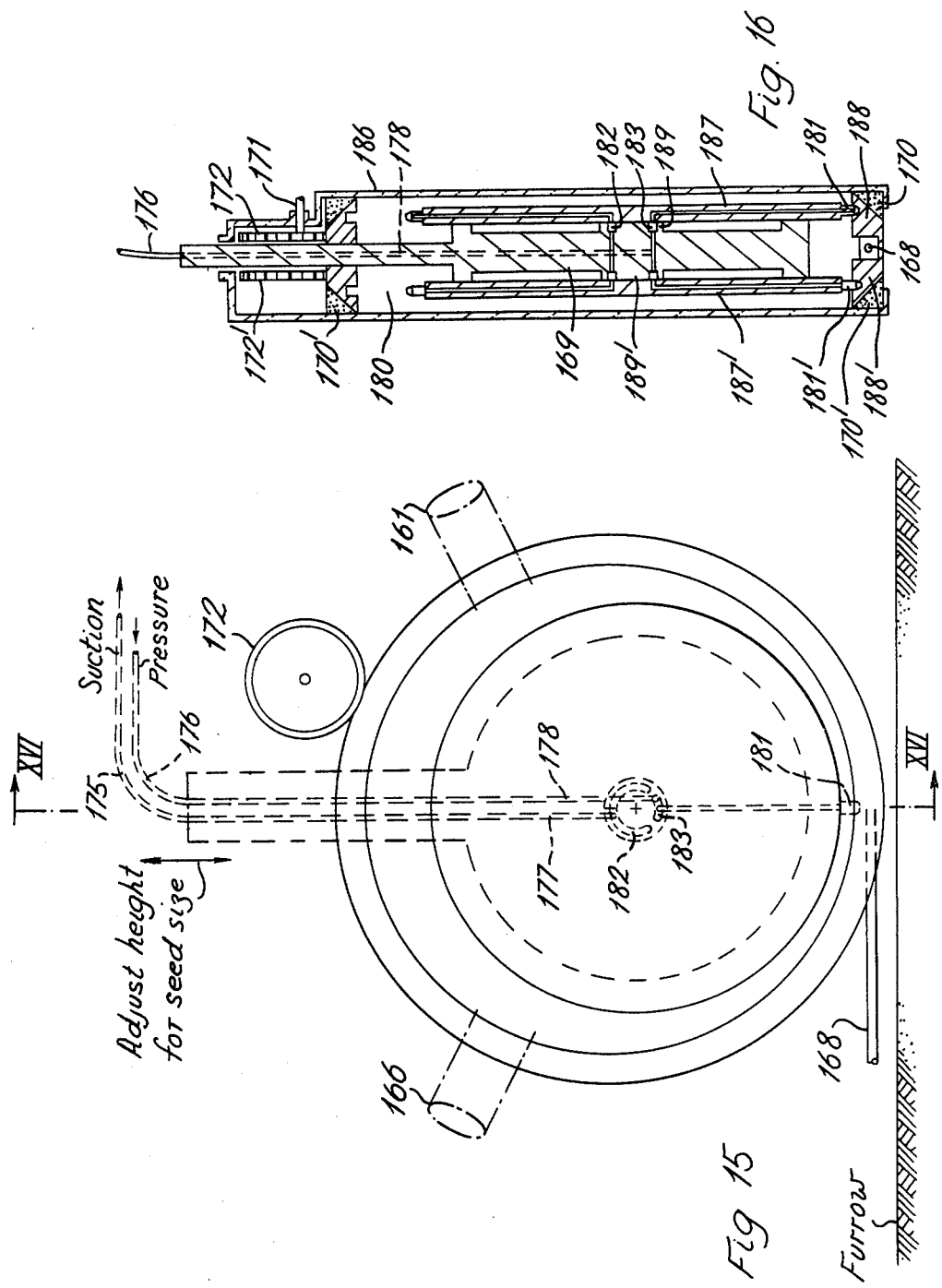

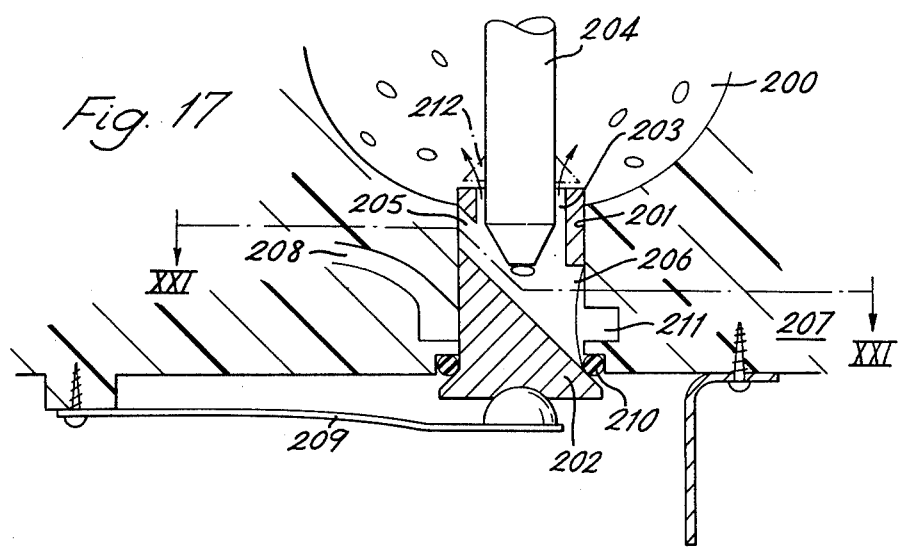
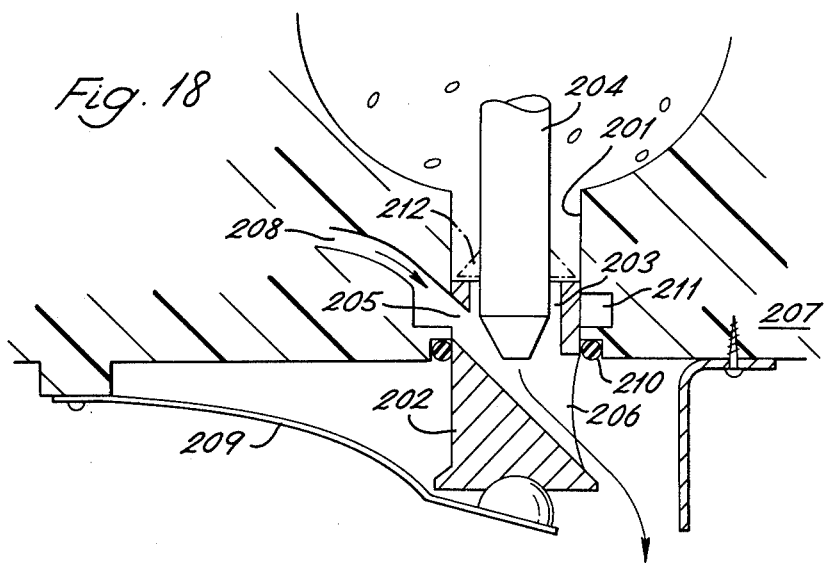

APPARATUS FOR DISPENSING SEEDS FROM LIQUID SUSPENSION

This is a continuation, of application Ser. No. 730,284, filed Oct. 6, 1976.

BACKGROUND OF THE INVENTION

1. Field of the Invention

The present invention relates to apparatus for dispensing discrete objects from a liquid, and is concerned in particular, but not exclusively, with apparatus for dispensing seeds individually from a suspension of seeds in water or aqueous solutions.

2. Description of the Prior Art

Some seed drills in common use are capable of dispensing seeds in the dry state individually for sowing at regular intervals. It is also known that there are advantages in sowing seeds in a wet state, that is to say after they have been allowed to imbibe water for a specified time. The main advantage is that the seed can be partially or completely germinated under determined conditions before drilling, with the result that the crop growth is quicker and more controlled.

However, it has not proved possible previously to drill seeds automatically in the wet state while providing a satisfactory control of the manner in which the seeds are dispensed.

SUMMARY OF THE INVENTION

According to the present invention there is provided apparatus for dispensing discrete objects from a liquid comprising, a suspension container for containing discrete objects in suspension in a liquid, a capture element defining a capture orifice allowing exit of liquid from the container and adapted to capture a number of the discrete objects against the orifice by means of a pressure difference across the orifice, transfer means for producing relative movement between the capture orifice and the objects in suspension in the liquid in such a manner as to have the capture orifice, after capture of an object or objects, situated in a region free from objects suspended in the liquid, and flow means for producing a flow of liquid past the capture orifice such as to sweep away excess objects attracted to the capture orifice by the said pressure difference, and removal means for removing a captured object or objects from the capture orifice for dispensing the object or objects.

Preferably the capture orifice has a combination of aperture size relative to the objects to be dispensed and pressure difference across it such that in normal operation one object at a time is captured on the capture orifice.

Also preferably the arrangement is such that the capture orifice is submerged in liquid throughout normal operation.

The pressure difference across the capture orifice may be maintained continuously, but preferably the removal means includes means for releasing or reversing temporarily the pressure difference holding the object or objects against the capture orifice.

The transfer means may comprise means for moving the capture orifice relative to the container to a region which in operation is free from objects suspended in the liquid. For example, the transfer means may comprise means for moving the capture orifice through an outlet port in the container to a region outside the container free from objects suspended in the liquid. The removal means may include means for providing a flow of liquid outside the container past the outlet port for moving the captured object or objects away from the outlet port after release from the capture orifice.

The transfer means may include a rotor for moving the capture element through the liquid by sweeping the capture orifice along a circular or part circular path, and in this and other arrangements there may be provided a plurality of capture elements movable by the transfer means and each defining a capture orifice.

Thus there may be provided a plurality of capture orifices mounted around a circumferential region of a first rotary member and a plurality of outlet ports mounted around a circumferential region of a second rotary member, the two rotary members being so positioned that the said two circumferential regions abut one another over a portion of the length of each and are spaced apart from each other over a portion of the length of each, the rotary members being arranged to rotate in co-operation with each other in such a manner that each capture orifice during part of the period of rotation is spaced from the outlet ports and is arranged to capture a seed from the suspension, and each capture orifice during another part of its period of rotation is brought into proximity with an outlet port and is arranged to transfer the seed from the capture orifice through the outlet port. The first and second rotary members may be so arranged that the said circumferential region of one of the rotary members lies within the said circumferential region of the other rotary member, the circumference of the inner circumferential region being of smaller length than the circumference of the outer circumferential region and the axes of the two rotary members being spaced apart.

In one arrangement, one of the rotary members comprises a disc with the capture orifices (or outlet ports) distributed around an outwardly facing edge of the disc, and the other of the rotary members comprises an annular flange extending axially from a second disc, the outlet ports (or capture orifices) of the said other rotary member being distributed around the inner surface of the said flange, and the two said circumferential regions being in register with one another in a single plane perpendicular to the axes of the two rotary members. Conveniently the first rotary member constitutes an inner rotary member and the second rotary member constitutes an outer rotary member around the first rotary member.

In some arrangements the transfer means may comprise means for producing a flow of liquid in the container to produce the said relative movement between the capture orifice and the objects in suspension by moving the objects relative to the container. In such cases the said flow means for producing the flow of liquid for sweeping away excess objects can conveniently be constituted by the transfer means or part thereof.

The removal means for removing the captured object or objects from the capture orifice may comprise means for producing a flow of liquid in the container for carrying the object or objects from the capture orifice through the outlet port.

In apparatus where the container has an outlet port for dispensing captured objects, there may be included inflow means for providing an inflow of liquid through the outlet port into the container sufficient to prevent escape through the outlet port of discrete objects other than those transferred from the capture orifice by the said transfer means. In such cases, the said flow means for sweeping away excess objects from the capture orifice can conveniently be constituted by the said inflow means for providing an inflow of liquid through the outlet port.

The inflow means may comprise a chamber or conduit communicating with the outlet port of the suspension container and adapted to contain liquid at a pressure above the pressure in the suspension container with a pressure difference sufficient to provide the required inflow of liquid through the outlet port into the suspension container.

The inflow means may include a delivery conduit communicating with the suspension container through the said outlet port, and means for providing a flow of liquid along the delivery conduit past the outlet port, the arrangement of the outlet port and the delivery conduit in operation being such as to effect pasage of a minor proportion of the liquid in the delivery conduit into the suspension chamber through the outlet port, the remainder of the liquid in the delivery conduit being arranged to carry along the delivery conduit objects which have been transfered through the outlet port.

The capture element may comprise a hollow tubular member through which liquid may flow out of the suspension container, the capture orifice being defined at an end of the tubular member which is situated within the suspension container during capture of an object.

There is also provided, in accordance with the invention, a method of dispensing discrete objects from a liquid comprising, dispersing discrete objects in suspension in a liquid in a container, capturing a number of the discrete objects against a capture orifice by applying across the capture orifice a pressure difference in a sense such as to cause exit of liquid from the container through the capture orifice, producing relative movement between the capture orifice and the objects in suspension in the liquid in such a manner as to have the capture orifice, after capture of an object or objects, situated in a region free from objects suspended in the liquid, and as a separate step or as a part of the above step, producing a flow of liquid past the capture orifice such as to sweep away excess objects attracted to the capture orifice by the said pressure difference, and removing a captured object or objects from the capture orifice for dispensing the object or objects.

The features which have been set out above as features of apparatus according to the invention also form the basis in general of features of the method according to the invention.

The apparatus and method are particularly applicable for metering seeds which are suspended in water.

Preferably there is provided means for agitating the liquid in the container to maintain the objects in suspension, and conveniently this agitation may be provided by movement of the capture element defining the capture orifice.

BRIEF DESCRIPTION OF THE DRAWINGS

Embodiments of the invention will now be described by way of example with reference to the accompanying drawings in which:

FIGS. 10 and 11 are end and side views, respectively, of electrical switching means for use with the apparatus shown in FIG. 6;

FIG. 15 is a side view of a modification of the apparatus shown in FIGS. 12, 13 and 14, the Figure showing in diagrammatic form a double-sided version of the apparatus shown in FIG. 12;

FIG. 16 is a cross-section along the lines XVI—XVI in FIG. 15;

FIGS. 17, 18 and 19 are diagrammatic representations, partly in cross-section, of a door arrangement suitable for use with embodiments of the invention for dispensing seeds, the Figures showing the door arrangement at three stages of operation;

DETAILED DESCRIPTION OF THE PREFERRED EMBODIMENTS

Figure 1:
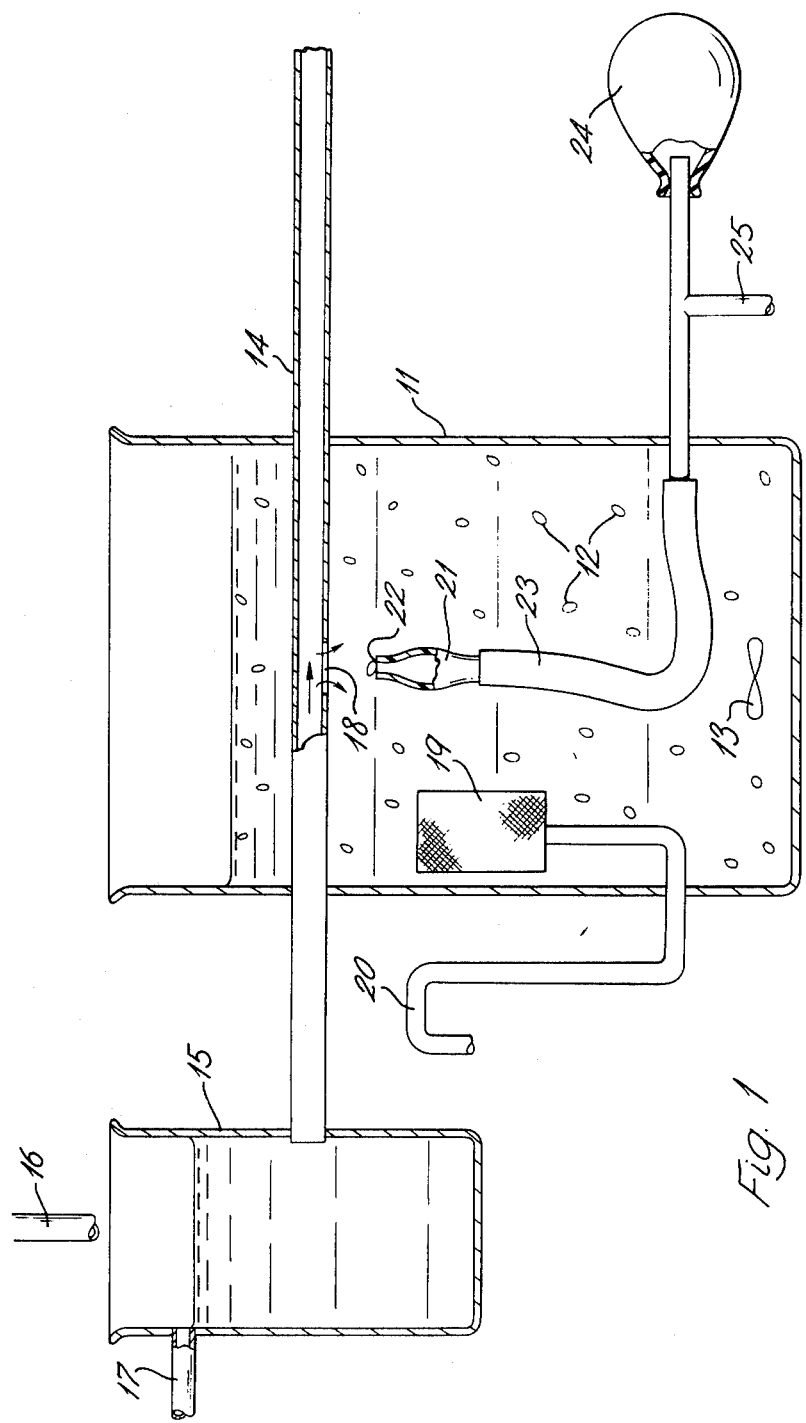
FIG. 1 is a diagrammatic representation of experimental apparatus which illustrates the principles of operation of the invention.

FIG. 1 is a diagram of apparatus which has been used to demonstrate the principle of operation of the invention, and is described herein by way of explanation. The various apertures and tube sizes are not drawn to scale in this Figure.

A tank 11 contains water in which seeds 12 are maintained in suspension by rotation of a paddle agitator 13, and the tank 11 constituted a suspension container. Passing through the tank 11 is a delivery conduit consisting of a delivery tube 14 through which is supplied a continuous flow of water from a constant head tank 15 supplied from an inlet pipe 16 and having an overflow pipe 17. The tank 11 has an outlet port 18 communicating with the delivery tube 14. A filter 19 within the tank 11 allows a small flow of water equal to the inflow through port 18 out of the tank 11 through an outlet pipe 20. The filter prevents the seeds from leaving the tank through the pipe 20. Within the tank 11 is a capture element consisting of a hollow tubular member or probe 21 having a small capture orifice 22 at its free end and being coupled at its other end to a flexible tube 23. The tube 23 is coupled to a rubber bulb 24 outside the tank 11 and to a further outlet pipe 25.

In normal operation the pressure in the delivery tube 14 is arranged to be slightly higher tha the pressure in the tank 11 so that there is a slight flow of liquid from the delivery tube 14 through the outlet port 18. This prevents seeds 12 being swept at random into the delivery tube 14 through the outlet port 18, and has a second function to be described hereinafter.

The principle of operation of the apparatus is as follows. A moist mass of seeds which have been allowed to imbibe for a specified period to produce the required degree of germination is placed in the water in the tank 11 and agitated by the agitator 13 to be evenly dispersed throughout the liquid. At this stage the probe 21 is positioned conveniently in the general body of liquid in the tank 11, and a seed 12 will quickly become trapped at the orifice 22 due to the continual outflow of liquid through the flexible tube 23 and the outlet tube 25. The end of the probe 21 together with the trapped seed is then inserted into the outlet port 18 in the wall of the delivery tube 14. By means of the rubber bulb 24, the pressure inside the probe 21 is made to exceed that in the delivery tube 14 and the seed is swept off the probe 21 down the delivery tube 14. It will be appreciated that to achieve this a tight seal at the outlet port 18 is not necessary. The bulb 24 is released, the probe 21 is withdrawn from the delivery tube 14 into the main body of liquid where it soon captures a further seed 12 by virtue of the outflow through the tube 25.

As has been mentioned, the apparatus is arranged to provide a slight flow of liquid from the delivery tube 14 into the tank 11 by adjusting the flow of liquid through the delivery tube 14 relative to the flow of liquid through the outlet tube 20. This is achieved by adjusting the heights of the tubes 20 and 14 relative to the levels in the tanks 15 and 11. One purpose of this flow through the outlet port 18 is to prevent random loss of seeds from the tank 11, as has been said. The second purpose arises because of the possibility of the capture orifice 22 capturing an excess number of seeds at any one time. In most preferred arrangements the orifice 22 will be required to capture one seed at a time, and any excess seeds captured will be swept off the end of the probe 21, as it approaches the outlet port 18, by the flow of liquid through the port 18 into the tank 11.

It will be appreciated that the purpose of FIG. 1 is to illustrate a number of underlying principles of the present invention. These principles include the capture on the capture orifice of a seed by a pressure difference across the capture orifice, the production of relative movement between the capture orifice and the cloud of seeds in supension in the liquid such as to bring the capture orifice to a region free of seeds in suspension, and the production of a flow or liquid past the capture orifice such as to sweep away excess objects attracted to the capture orifice by the said pressure difference. In the example shown in FIG. 1, the relative movement between the probe 21 and the seeds 12 in suspension is produced by moving the probe 21 relative to the container 11. In other embodiments, this relative movement may be obtained by keeping the probe 21 stationary relative to the container, and by producing a flow of liquid in the container such as to sweep the cloud of dispersed seeds to a part of the container away from the probe. This having been achieved, the captured seed is then released and transferred to the outlet conduit. This alternative method of producing the required relative motion will be described in more detail with reference to FIG. 6.

Similarly, although in the simple example of FIG. 1 the flow of liquid provided to sweep excess seeds away from the capture orifice 22 is provided by the inflow through the outlet port 18 from the conduit 14, it will be appreciated that in other arrangements this flow of liquid to clear excess seeds may be provided by a separate nozzle in the container operated independently of a flow through an outlet port. Yet another variation which may arise from the simple apparatus shown in FIG. 1, concerns the means provided for preventing excess seeds from moving the container 11 into the outlet delivery conduit 14. In FIG. 1, this random loss of seeds is prevented by the slight inflow through the outlet port 18 into the container 11, but in other arrangements there may be provided a door mechanism over the outlet port 18 which prevents the random loss of seeds. The door mechanism may be opened just before the seed 22 is transferred through the outlet opening 18. Again, this alternative will be described in more detail hereinafter.

Practical seed dispensing devices must:

(a) dispense very close to the soil (i.e. at the bottom of the apparatus so that accuracy is not lost through long conduits;

(b) have accurate control over the frequency of dispensation;

(c) be narrow in cross-section thus allowing rows of seeds to be established close together when desired.

The general design of the following practical embodiments was determined by these considerations.

Referring now to FIGS. 2, 3 and 4, there is shown a practical embodiment of the invention. A main housing 26 of the device is formed of three principal layers shown most clearly in the cross-section of FIG. 4 at 27, 28 and 29. The outer layers 27 and 29 are rectangular sheets of synthetic plastics material and the central layer 28 is formed of a number of separate elements shaped to produce the contours shown in FIG. 2. The elements of the housing 26 are conveniently screwed or bolted together by screws or bolts (not shown) passing through holes 30 shown in FIG. 2.

The housing 26 defines a U-shaped suspension container 32 which may be charged with batches of seeds or through which a suspension of seeds in water is continuously from an inlet tube 33 to an outlet tube 34 by a circulation system shown in FIG. 5. The inlet tube 33 (FIG. 2) is connected to an inlet pipe 35 (FIG. 5) leading from a seed reservoir 36, and the outlet tube 34 (FIG. 2) is connected to an outlet pipe 37 (FIG. 5) which leads back to the seed reservoir 36 through a venturi arrangement 38. A pump 39 draws clear water by way of a filter 40 from the seed reservoir 36, and returns the clear water through the venturi arrangement 38 to the seed reservoir 36. The passage of this water through the venturi 38 produces the required suction in the return pipe 37.

At the base of the suspension container 32 is an outlet port 41 communicating with a delivery conduit 42 formed in the main housing 26 and leading to a delivery nozzle 43. Water is supplied to the conduit 41 by a supply pipe 44 leading from a tank 45 providing a constant head of water by means of a water supply 46 and an overflow pipe 47. Other means of supplying the flow in the conduit 42 may be provided, for example as will be described hereinafter with reference to subsequent Figures. An access port 48 gives access to the delivery conduit 42 for cleaning purposes and is closed by a bung 49. Surrounding the outlet end of the delivery pipe 42 is an outer tube 50 with a small bleed pipe 51.

Within the suspension container 32 is a capture element 52 comprising a hollow tubular member or probe. The probe 52 comprises a hollow cylindrical glass tube 53 with a metal cap 54 fitted by a close push fit into the glass tube 53. The metal cap 54 defines a capture orifice 55 at its lower extremity. The probe 52 is arranged as a sliding fit within an outer support tube 56 which in turn is mounted in a vertical position in the main housing 26.

Figure 2:
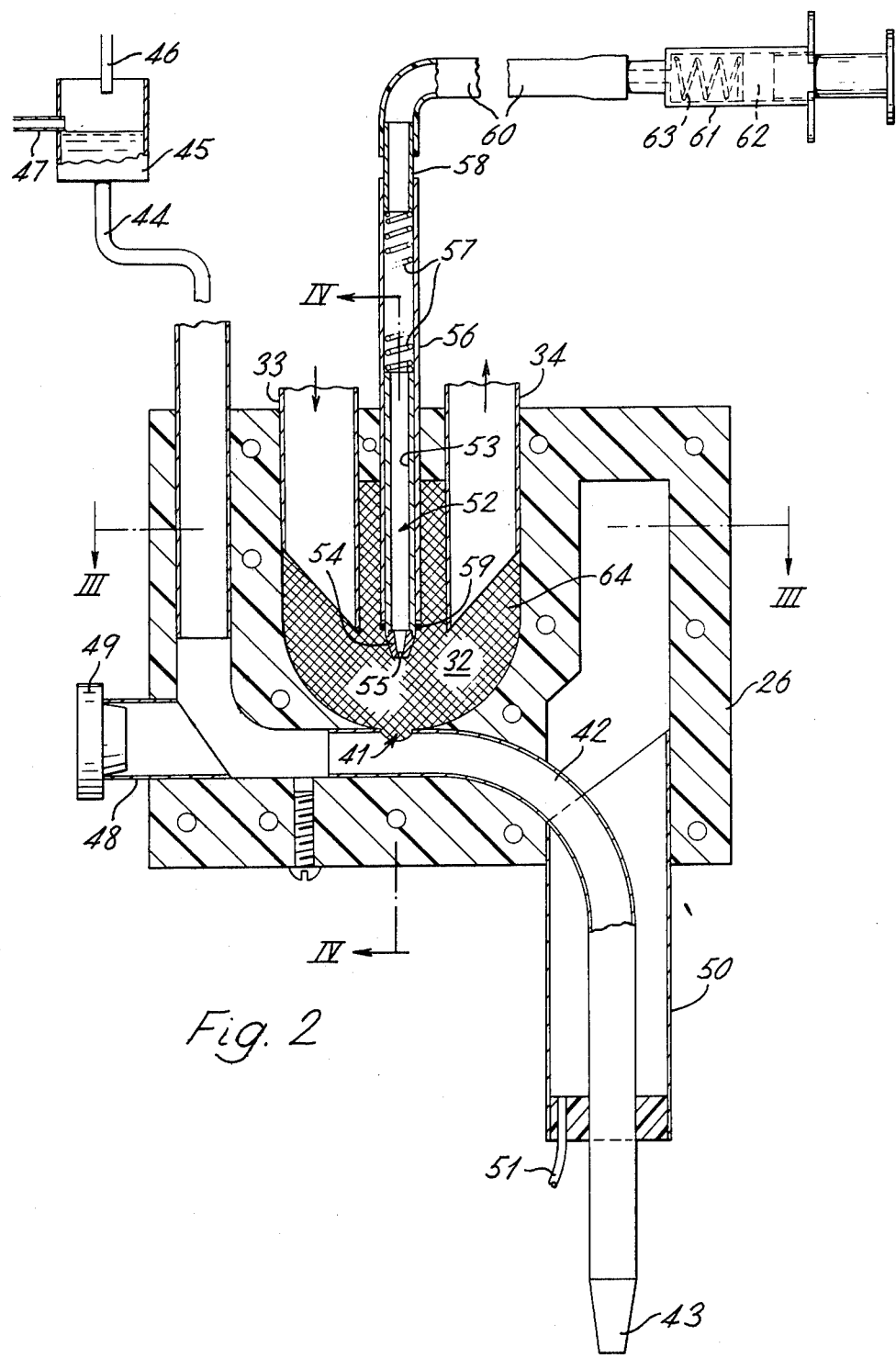
FIG. 2 shows, partly in section and partly in diagrammatic form, apparatus embodying the invention for dispensing seeds.

The probe 52 is downwardly biassed by a compression spring 57 acting between the top of the probe 52 and a stop 58. The spring 57 is so arranged that, in its rest position without a pressure difference applied across the probe 52, the probe 52 falls to a lower position in which the cap 54 protrudes through the outlet port 41. In FIG. 2, the probe 52 is shown in its most raised position (effected as will be described hereinafter) in which the spring 57 is compressed and the probe 52 is prevented from rising further by a collar 59 around the outside of the cap 54. The top of the support tube 56 is coupled to a flexible length of tubing 60 which is connected to a manually operated syringe 61. The plunger 62 of the syringe is biassed by a spring 63 towards the end of the syringe remote from the nozzle connected to the pipe 60.

Figure 3:
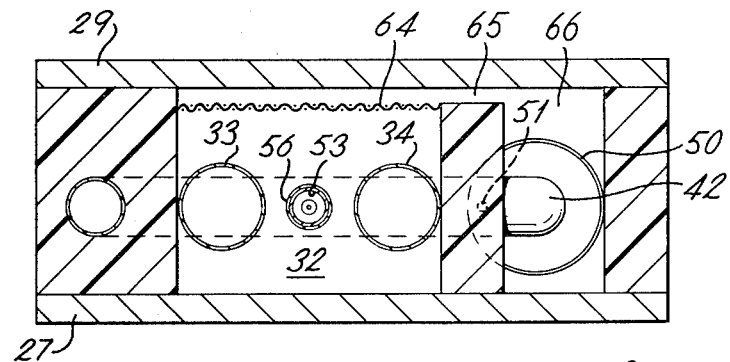
FIGS. 3 and 4 are cross-sections taken along the lines III—III and IV—IV, respectively, in FIG. 2.

As may be seen best in FIG. 3, the rear of the suspension chamber 32 is bounded by a filter 64 which divides the container 32 from a rear passageway 65 leading to a side chamber 66 which communicates with the outer tube 50 surrounding the delivery conduit 42. A liquid passing through the filter 64 along the passageway 65 to the outer tube 50 is allowed to drain through the bleed tube 51 which may conveniently lead to earth for watering the seed bed. This slight outflow at the bleed tube 51 arises because the level in the header tank 45 is maintained such as to give a pressure greater than the pressure in the suspension container 32 in order to provide a small inflow of liquid through the outlet port 41 into the suspension container 32. This small inflow finds its way through the filter 64 to the outer tube 50 and thence to the bleed tube 51. As an alternative to allowing the excess water to drain to earth through the bleed tube 51, this tube may be coupled to a venturi arrangement in the inlet supply tube 44 such that the flow along the tube 44 produces a slight vacuum which returns the flow from the bleed pipe 51 into the main flow into the delivery tube 42.

The pressure in the delivery tube 42 is arranged throughout to be greater than the pressure within the suspension container 32 so that the small inflow of liquid through the outlet port 41 prevents random loss of seeds through the outlet port 41 into the delivery tube 42.

There will now be described the manner of operation of the embodiment shown in FIG. 2. The normal rest position for the apparatus occurs with the probe 52 resting at its lowest position with the cap 54 protruding through the outlet port 41. The next step is the depression of the plunger 62 in the syringe 61 which produces a slight flow of liquid through the capture orifice 55, most of the liquid from the syringe escaping along the sliding fit between the probe 52 and the outer tube 56. Upon release of the plunger 62 of the syringe 61, the spring 63 returns the plunger 62 to its outer position which reduces the pressure in the tube 56. Due to the relatively small size of the capture orifice 55, the effect of this reduced pressure within the probe 52 is to raise the probe 52 to its uppermost position, as shown in FIG. 2, and to maintain within the probe 52 a pressure difference across the capture orifice 55. This pressure difference rapidly captures on the capture orifice 55 one or more seeds which remain on the capture orifice. There next follows a period when the pressure within the probe 52 gradually drops as liquid from the suspension chamber 32 passes between the probe 52 and the outer support tube 56. As the pressure in the probe 52 drops there comes a time when the upward force on the probe 52 is less than the downward force provided by the spring 57 and at this stage the probe 52 is returned by the spring 57 to its lowermost position with the cap 54 protruding through the outlet port 41. As the capture orifice 55 passes through the outlet port 41 and comes to rest, the pressure within it rises to that in 32 and the inflow of liquid from the delivery tube 42 through the outlet port 41 has the effect of sweeping away from the capture orifice 55 any excess seeds clinging to the capture orifice 55. After the capture orifice 55 has been swept by the inflow through the outlet port 41, there will generally remain on the capture orifice a number of seeds which has been predetermined as the number required to be dispensed at each cycle of the apparatus. Usually the orifice size will be chosen having regard to the size of the seeds to be such that only a single seed remains captured after the sweeping action of the inflow through the outlet port 41. However, it will be appreciated that in some circumstances it may be desirable to arrange the aperture size of the capture orifice 55 to be such that a number of seeds greater than one is captured, for example two or three seeds. This number will however be predetermined within a probability range and will differ from the random cluster of seeds which may collect around the capture orifice 55 before the sweeping action of the inflow through the outlet port 41. When a capture orifice size is chosen greater than that required for a single seed, it may not be possible to always dispense exactly the same number of seeds at each operation, but the number dispensed will fall on a probability basis within a predetermined range, (for example 2 to 4) and will be determinable with much greater accuracy than the random cluster produced before the sweeping action of the inflow through the outlet port 41. However, in the following description it will be assumed that the aperture size of the capture orifice is designed with the object of dispensing a single seed at each stroke of the apparatus.

The final stage of the dispensing of a seed takes place with the next depression of the plunger 62 in the syringe 61. This releases and reverses momentarily the pressure difference at the capture orifice 55 and releases the seed, if not already swept away, which is swept along the delivery tube 42 by the flow of liquid from the supply pipe 41. The seed is then dispensed at the outlet nozzle 43.

Figure 4:
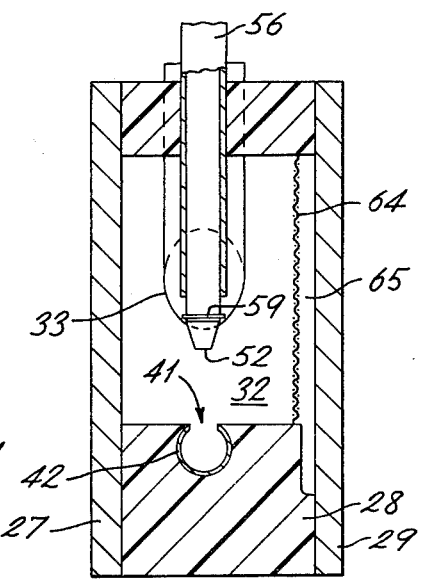

By way of example of the dimensions of the elements shown in FIGS. 2, 3 and 4, the probe 52 may consist of a hollow glass tube 5 cms long having internal and external dimensions of 6 mm and 4 mm diameter, respectively. The capture orifice 55 in the metal cap 54 may have a diameter in the range 0.1 to 0.5 mm and a suitable diameter for a seed, such as a celery seed, is 0.25 mm. The diameter of the outlet port 41 is conveniently 6 mm, sufficient to accept the tapered cap 54. The syringe 61 conveniently has a capacity of 10–15 cc. Dimensions of the other elements supported in the main housing 26 may be taken from the drawing which is generally to scale.

It is to be noted that in some arrangements the seed may be arranged to be released from the capture orifice 55 once this has protruded into the delivery tube 42 even without a final depression of the plunger 62 in the syringe 61. In such a case, the flow of fluid down the delivery tube 42 may be enough to dislodge the seed from the capture orifice. Whether this step is arranged to occur will depend upon the relative strengths of the springs 57 and 63, and the flow in the tube 42.

A further embodiment will now be described with reference to FIGS. 6 to 11. This embodiment differs from those described so far in that there are no moving parts in the main structure of the dispensing apparatus. The main components of the dispensing device are formed in a housing 67 which is conveniently formed of synthetic plastics material. The housing 67 contains a number of internal chambers and passages and is conveniently made from three layers 68, 69 and 70 or plastics material (see FIGS. 7, 8 and 9) which are cut or moulded to provide passageways and are then bolted together or fastened by adhesive to form a sandwich construction. The general construction is of a form well known in the art of fluidic devices. Access to the device is provided through a number of hollow tubes which slot into apertures in the housing 67.

Figure 5:
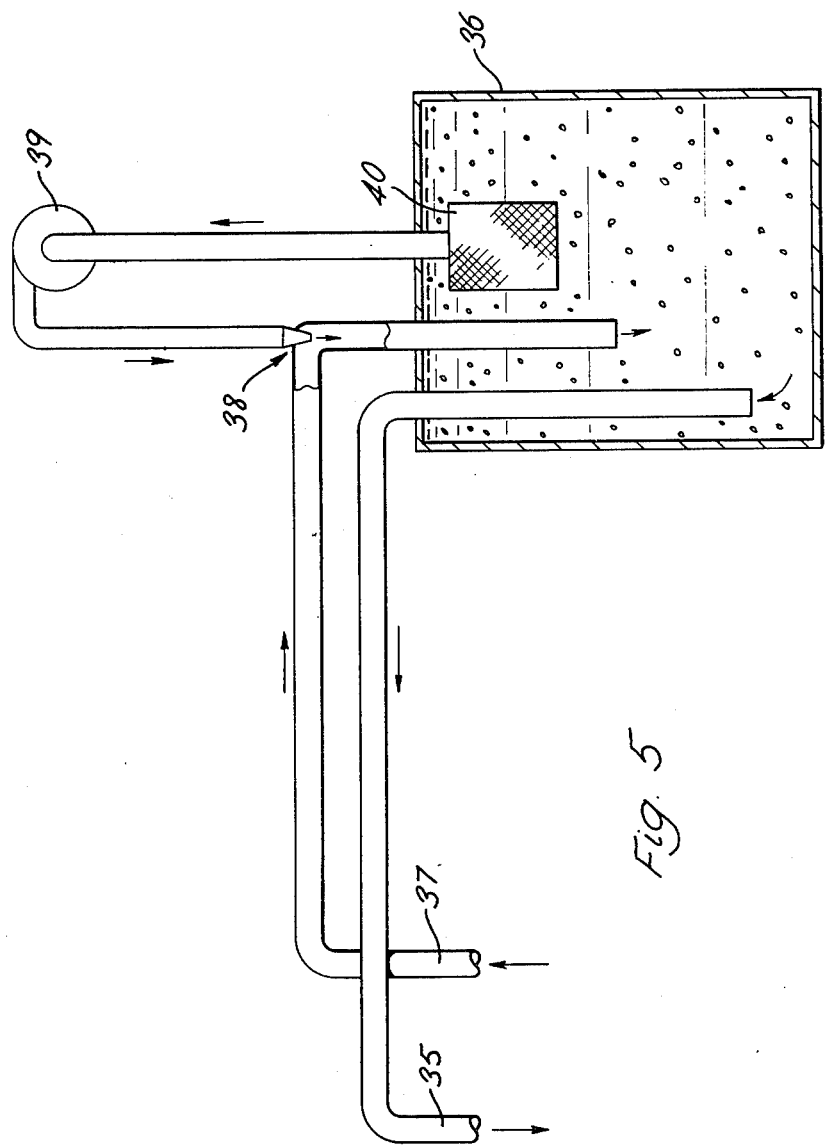
FIG. 5 is a diagrammatic representation of apparatus suitable for circulating a seed and water suspension through a seed chamber of the apparatus shown in FIG. 2, or of the apparatus shown in FIG. 6.
Figure 6:
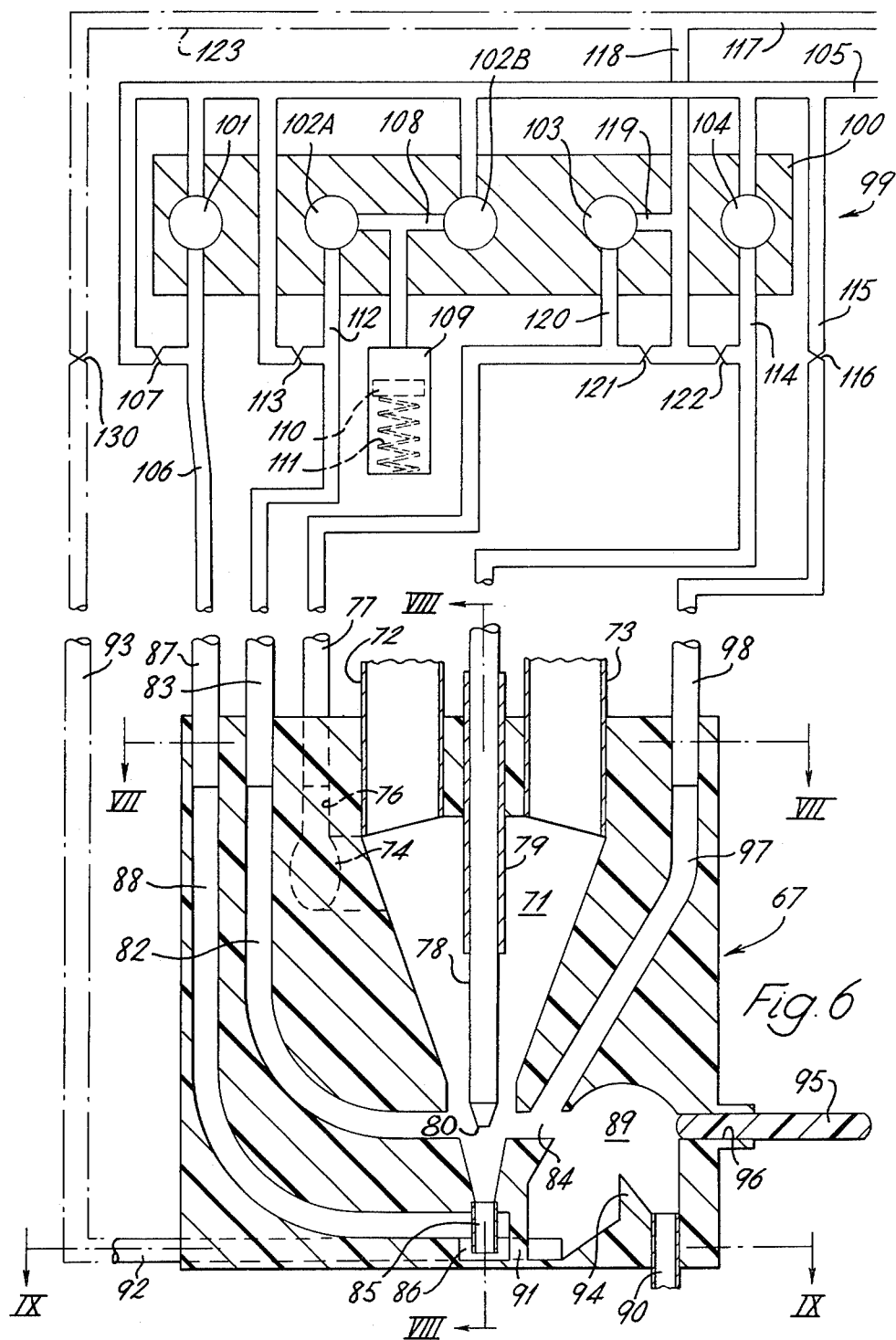
FIG. 6 shows, partly in section and partly in diagrammatic form, a further apparatus embodying the invention for dispensing seeds.
Figure 7:
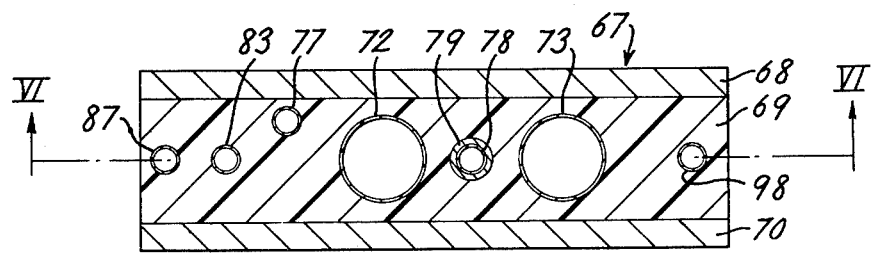
FIGS. 7, 8 and 9 are cross-sections along lines VII—VII, VIII—VIII and IX—IX respectively, in FIG. 6.
Figure 8:
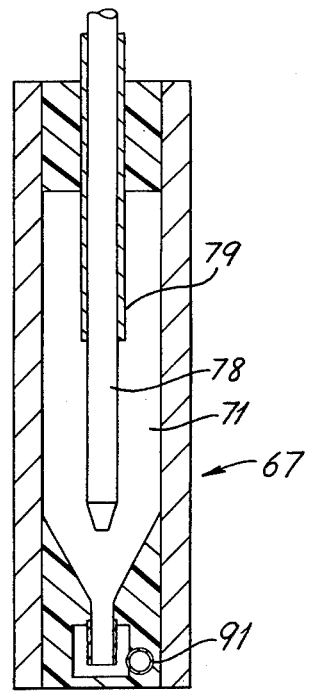
Figure 9:
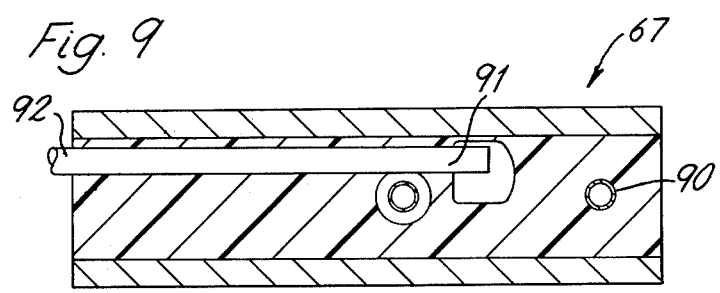

Referring now mainly to FIG. 6, the housing 67 defines a main suspension container comprising a seed chamber 71 for containing a suspension of seeds in water. The seed chamber 71 is generally trapezoidal and at the top has two metal tubes 72 and 73 providing for entry and exit of seeds and water. A seed and water suspension is circulated through the seed chamber 71 by means of the tubes 72 and 73 and the circulation arrangement may be of the same form as has been described in the embodiment of FIG. 5. Also giving access to the suspension chamber 71 is a passageway 76 leading to the rear of the chamber 71 and connected to an external pipe 77. The purpose of the access through the pipe 77 is to maintain the pressure in the seed chamber 71 at required levels throughout the cycle of operation as will be described hereinafter. A filter 74 across the passageway 76 prevents seeds from entering the pipe 77.

Running along the central axis of the seed chamber 71 is a horizontal hollow tube or probe 78 constituting a capture element. The probe 78 is not shown in detail but may conveniently be constructed in the same form as the probe 52 described with reference to FIG. 2, in the previous embodiment. In the embodiment of FIG. 6, the probe 78 is arranged to be stationary in the seed chamber 71 during the cycle of operation, but the probe 78 is adjustable manually by sliding as a relatively stiff push fit in a supporting tube 79 which is fixed relative to the housing 67. The height of the probe 78 is arranged to be such that the end of the probe, in which is positioned a capture orifice 80 corresponding to the capture orifice 55 in the embodiment of FIG. 2, is positioned at the same horizontal level as a passageway 82 formed in the housing 67 and terminating in the region of the lower end of the seed chamber 71. The passageway 82 leads from an external pipe 83 and is continued on the other side of the seed chamber 71 in a passageway 84. The passageway 84 is substantially horizontal, as is the end of the passageway 82 where it enters the seed chamber 71.

Below the passageways 82 and 84, and along the same access as the probe 78, the seed chamber 71 terminates in a vertical passageway 85 which opens into a small chamber 86 formed in the central layer 69 of the housing 67. The chamber 86 is in communication with an external pipe 87 by means of a passageway 88 in the housing 67.

The passageway 84 leaving the seed chamber 71 opens into a delivery chamber 89 having a curved ceiling leading to a vertical seed outlet passageway 90. A further outlet passageway 91 leads from the base of the chamber 89 and either leads to an outlet drainpipe 92 or alternatively leads to a suction return pipe 93 which is optional and is shown in chain dotted lines in FIG. 6. An internal wall 94 rises between the seed outlet 90 and the drain outlet 91 having a purpose which will be described hereinafter. A removable sliding bung 95 is positioned in a bore 96 immediately opposite and in line with the passageway 84 and is provided for cleaning purposes. A further passageway 97 gives access into passageway 84 and is inclined towards the junction of the passageway 84 and the seed chamber 71. The passageway 97 is in communication with an external pipe 98.

Also included in the dispensing apparatus shown in FIG. 6 is a pressure control means indicated generally at 99. The pressure control means 99 comprises a frame indicated diagrammatically as 100 carrying five electromagnetic solenoid valves indicated by reference numerals 101, 102A, 102B, 103 and 104 respectively. Each of the valves 101, 102B, 103 and 104 has an input coupled to a conduit 105 for providing a high pressure supply to the apparatus. The pipe 105 may be connected conveniently to a tank of water providing a constant head of water, for example as has been described with reference to FIG. 2. The valve 101 has an outlet pipe 106 which is coupled to the external pipe 87. The pressure line 105 is also connected to the outlet pipe 10 through a restriction 107. The valve 102B has an outlet passageway 108 which leads to the inlet of the valve 102A and is also in communication with an accumulator 109. The accumulator is a device for storing liquid under pressure and may, for example, be a cylinder having a spring loaded piston such that when the valve 102A is closed and the valve 102B is open, the accumulator fills with liquid under pressure by movement of the piston 110 against the spring 111. When, as will be described hereinafter, the valve 102B is closed and the valve 102A is opened, a predetermined quantity of water at high pressure will pass through the valve 102A. The valve 102A has an outlet pipe 112 which is connected to the external pipe 83 of the housing 67. The high pressure supply pipe 105 is also connected to the outlet pipe 112 through a restriction device 113. The valve 104 has an outlet pipe 114 which is connected to the probe 78. A further pipe 115 leads from the pressure supply pipe 105 through a restriction device 116 to the external pipe 98 of the housing 67.

There is also provided a suction pipe 117 through which liquid is withdrawn from the apparatus to a low level or a pump system which maintains a constant pressure below atmospheric pressure. The suction pipe 117 is connected through a pipe 118 to an inlet 119 to the valve 103. The valve 103 has an outlet pipe 120 connected to the external pipe 77 of the housing 67. The suction pipe 117 is also connected by the way of the pipe 118 through a restriction device 121 to the outlet pipe 120 of the valve 103, and also through a restriction device 122 to the outlet pipe 114 of the valve 104.

Finally, as has been mentioned, an optional external pipe 93 may be provided leading from the housing 67, and this may optionally be connected through a restriction device 130 and a pipe 123 to the suction pipe 117.

The control of the valves 101 to 104 can be mechanical but, as shown here, it is effected by electrical signals supplied by a rotary cam switching means shown in FIGS. 10 and 11. As shown in these Figures a cam cylinder 124 carries five annular cams 125 each of which operates an electrical switch 126 individual thereto. The cam rotor 124 is suspended by end brackets 127 on a base 128 and is driven by an electric motor 129 having a variable speed of rotation. The outputs of the switches 126 consist of voltages which are applied to the solenoid valves 101 to 104 respectively.

There will now be described the manner of operation of the embodiment shown in FIGS. 6 to 9. The operation is cyclical and the operation will be considered from the point at which a seed has just been dispensed and the apparatus is in a position to capture a fresh seed on the probe 78. It is convenient to refer to the flow rates at various points by comparison with the flow through the tube 98 since this is substantially constant throughout and is set by the restriction device 116. Since the changes of pressure at various parts of the apparatus will interact with each other, the pressures referred to in this example are only approximate, and should be taken in conjunction with the flow rates described at various stages of operation. As an example, the pressure in the suction pipe 117 may be set at −50 inches of water relative to atmospheric pressure, and the pressure in the pressure supply pipe 105 may be set at +75 inches of water. The pressure in the pipe 98 is then arranged to be about +2 inches of water, with a small continual flow of, for example, 1.5 cc per second.

At the initial stage, when the probe 78 is to capture a seed, the valve 101 is closed with the pressure and flow in the pipe 87 determined by the flow through the restriction device 107. This is arranged to give a pressure in the range 0 to 8 inches of water above atmospheric pressure and a flow rate approximately 50% of that through the pipe 98. At this stage, the valve 102A is closed so that the pressure in and flow through the tube 83 are determined by the restriction device 113 which is selected to be such that the pressure in the pipe 83 is in the range +12 to +18 inches of water and a flow rate again about 50% of the flow rate in the pipe 98. At this stage, the valve 102B is open, and the accumulator 109 is charged from the pressure pipe 105. Also, during this stage, the valve 104 is closed so that the pressure in and flow through the probe 78 are determined by the restriction device 122, which is arranged to provide a pressure in the probe of about −48 inches. The flow will be very small indeed due to the small size of the orifice in the capture element. The valve 103 is also closed and the pressure in and flow through the pipe 77 are determined by the restriction device 121, which is arranged to be such that the pressure in the pipe 77 is about −4 inches of water and the flow in the pipe 77 is about 1½ times the flow in the pipe 98. Finally, at this stage, the flow out through the free end of the pipe 84 is arranged to be about half the flow through the pipe 98.

In the first stage of operation of the cycle the following functions take place. The seed suspension is provided as a single charge or is circulated through the seed chamber 71 by the circulation system shown in FIG. 5 or by other convenient means. The flow down the passageway 97 divides at the passageway 84 and about half the flow passes into the seed chamber 71, the other half passing out at a low flow rate into the chamber 89. The purpose of the flow along the pipe 84 into the chamber 71 is to prevent seeds flowing out of the chamber 71 at random. The remaining flow out of the conduit 84 prevents air from entering the chamber 71 and, being at a low rate, falls to the left of the wall 94 and passes to the drain pipe 92. The flow is not sufficient to cross the wall 94 into the outlet tube 90. A small positive flow along the passageways 87 and 83 prevents seeds leaving at random up these passageways. The pressure difference across the probe 78 enables a seed to be captured on the probe orifice.

The next stage of operation has for its function the clearing of the cloud of seeds away from the end of the probe 78 towards the upper part of the seed chamber 71. This is achieved by opening the valve 101 so that the pressure in the tube 88 rises to the pressure in the pressure supply pipe 105 and the flow rate along the tube 87 rises to equal that through the pipe 98. At the same time the valve 103 is opened to supply the full suction from the line 117 to the pipe 77. The purpose of this is to keep the pressure in the seed chamber 71 at about −4 inches of water rather than letting it rise as a result of the increased flow through the tube 87. The other valves remain in the same positions as in the first stage.

The final stage of the cycle of operation has for its function the release of a seed from the probe 78 and the transfer of the seed to the outlet pipe 90. This is achieved by leaving the valve 101 open, closing the valve 102B, opening the valve 102A, leaving the valve 103 open, and opening the valve 104. The effect of these steps is as follows. The flow through the pipe 87 remains equal to the flow through the pipe 98, and so keeps the seeds in the upper part of the seed chamber. The application of the full pressure of 50 inches of water from the pressure pipe 105 to the probe 78 releases the seed from the capture orifice, and at the same time the opening of the valve 102A produces a high pressure flow of water from the accumulator 109 through the conduit 82, which sweeps the seed rapidly along the conduit 84 across the wall 94 and into the outlet tube 90. At this time the flow through the tube 82 is approximately three times the flow through the pipe at 98. This flow is arranged to be sufficient easily to clear the wall 94 so that the seed does not fall into the drainpipe 92, but instead passes to the outlet pipe 90.

The pressure in the seed chamber 71 remains substantially constant at minus 4 inches of water throughout the cycle, but rises slightly during the third phase of the cycle.

After the third stage of the cycle, the valves are returned to the positions already described for the seed capture stage of the cycle, which is then repeated. Conveniently the seed capture stage of the cycle may occupy 70 percent of the cycle period, the second stage of the cycle for clearing the seeds away from the end of the probe may occupy 20% of the period of the cycle, and the third and final stage during which the seed is ejected may occupy 10% of the period of the cycle.

Figure 12:
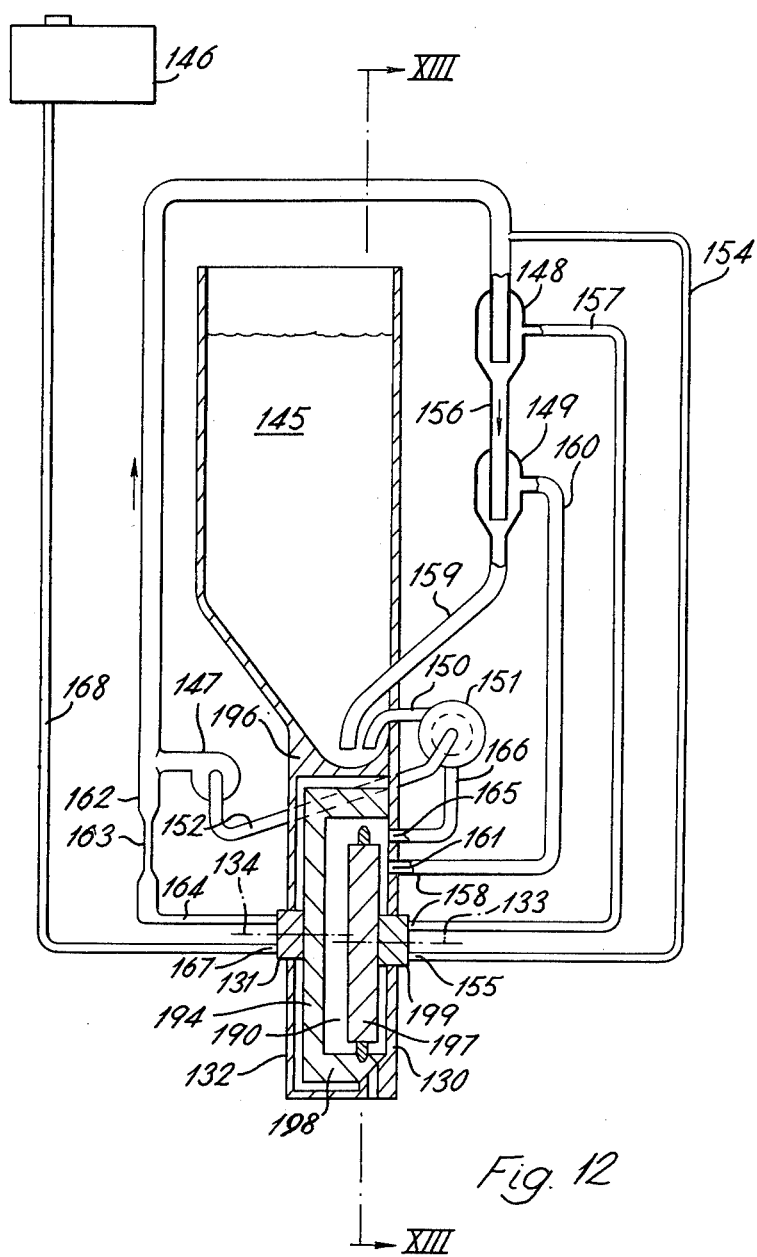
FIG. 12 is a diagrammatic representation, partly in section, of apparatus embodying the invention for dispensing seeds, the view being taken towards one edge of the apparatus and the Figure also showing in diagrammatic form the operating water supply to the various parts of the apparatus.

Referring firstly to FIG. 12, a housing 196 defines a cylindrical lower tank 190 which constitutes a suspension container for a suspension of seeds in water, and a hopper-like upper tank 145 also containing the suspension. Within the tank 11 are a first rotary member constituted by a first disc 197 and a second rotary member in the form of a ring 198 constituted by an annular flange extending axially from a second disc 194, the two discs 197 and 194 being rotatably mounted on opposed side walls of the tank 190. The disc 197 is rotatably mounted by a stub axle (not shown) extending from or journalled in a boss 199 set in a side wall 130 of the tank 190. The second disc 194 is similarly mounted on a stub axle (not shown) extending from or journalled in a boss 131 set in a side wall 132 of the tank 190. The bosses 199 and 131 are fixed relative to the walls 130 and 132, and each has a plane face directly abutting the disc associated therewith. The discs 197 and 194 rotate with a sliding contact against the bosses 199 and 131, respectively. The bosses 199 and 131 have a number of ports which interact with ports on the discs 197 and 194, respectively, in order to supply water under various operating pressures to the discs 197 and 194 in a manner which will be described further hereinafter. For simplicity, in FIG. 12 the openings in the discs 197 and 194 are not shown.

Figure 13:
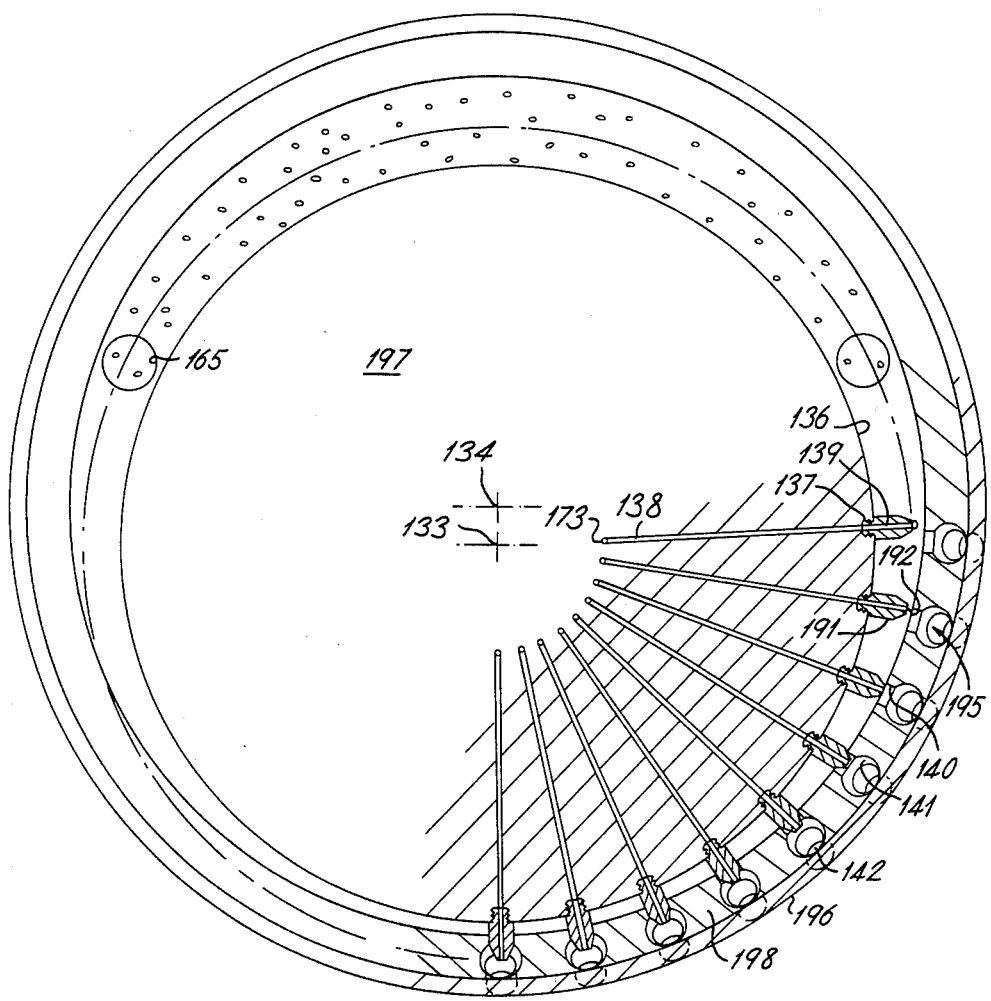
FIG. 13 is a side section in diagrammatic form taken along the lines XIII—XIII in FIGS. 12 and 14 and showing the operational relationship between the main components of the apparatus shown in FIG. 12.

As can be seen in FIGS. 12 and 13, the second disc 194 is mounted centrally within the tank 190 and has an axis of rotation 134 coincident with the axis of the tank 190. The first disc 197 is mounted within the encompass of the ring 198 but is mounted eccentrically relative to the second disc 194, with the axis of rotation 133 of the disc 197 spaced from the axis of rotation 134 of the second disc 194. Conveniently the axis 133 is positioned in the same vertical plane as the axis 134 but with the axis 133 below the axis 134 so that the outer perimeter of the disc 197 and the inner perimeter of the ring 198 are closest to each other at the lowermost point of each. As is shown in FIG. 12, the ring 198 extends axially from the disc 194 a distance sufficient to encompass the disc 197, and also sufficient to contact the side wall 130 in a rubbing contact seal at 135.

Referring now to FIGS. 12 and 13, the disc 197 carries a plurality of probes 191 evenly distributed around a circumferential region of the disc 197, constituted by an edge perimeter 136. Each of the probes 191 extends radially outwardly from the edge perimeter 136 and is secured in a screw threaded bore 137 in the disc 197. Each probe 191 defines at its outer end a capture orifice 192 which communicates by way of a bore 139 through the probe 191 with a radial bore 138 in the disc 197. Each radial bore 138 in the disc 197 leads to a bore 173 parallel to the axis 133 of the disc 197 and leading to the right in FIG. 12 to mate with the ports (not shown) in the boss 199 which have already been referred to and which are arranged to provide the required operating pressures to the probes 191 at the appropriate intervals of rotation of the disc 197.

Figure 14:
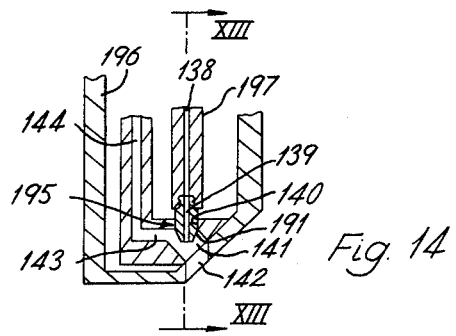
FIG. 14 shows an enlarged detail of an outlet port of the apparatus shown in FIGS. 12 and 13.

As can be seen best in FIGS. 13 and 14, the ring 198 defines a plurality of outlet ports 195 in the form of pockets 140 each having a generally radial axis and each communicating with a delivery conduit 43 formed in the ring 198. The pockets 140 are spaced round a circumferential path of the ring 198 which lies around the inward facing perimeter of the ring 198. The distance between each pocket 140 and its next adjacent pocket is the same as the distance between each probe 191 and its adjacent probe, and the discs 197 and 194 are so positioned that the probes 191 come into register with the pockets 140 over a portion of the circumferential paths of the disc 197 and the ring 198. The portion of the circumferential paths over which the probes 191 engage the pockets 140 extends over about the lowermost one-third of the said circumferential paths. For the remaining two-thirds of the said circumferential paths, the probes 191 are spaced from the pockets 140. It will be appreciated that the matching of the probes and pockets is achieved by providing a greater number of pockets 140 than probes 191 in the manner of the teeth of a gear wheel running within a larger gear wheel.

Referring now to FIG. 14, there is shown in section an enlarged detail of the engagement of a probe 191 with a pocket 140 at the lowermost point of rotation of each. The probe 191 is arranged to be a relatively close fit in the pocket 140 so as to form a seal. A delivery conduit 143 in the ring 198 has an inclined portion 141 which is in register with an opening 142 in the housing 196 through which the dispensed seeds are passed to the soil. The delivery conduit 143 constitutes part of means for removing a seed from the end of a probe 191, and is in communication via a radial passageway 144 individual thereto with the said control ports (not shown) in the boss 131. The opening 142 is defined only at the lowermost part of the tank 190 and communicates with only one outlet port 195 at any time.

Returning now to FIG. 12, there is shown strictly in diagrammatic form only, a number of external supply conduits leading to the housing 196 and arranged to supply water at various operating pressures. The general arrangement of these pipes and passageways will now be explained.

A number of different circulatory paths are defined between the upper and lower tanks 145 and 190, and these are driven by a pump 147 and two venturi arrangements 148 and 149. In a first of these circulatory paths, the pump 147 draws from the upper tank 145 a flow of the seed and water suspension flow through an outlet pipe 150 to a filter 151. After the filter 151, a flow passes along a further pipe 152 communicating with the pump. Due to the presence of the filter 151, the water reaching the pump 147 is clear water without seeds. This clear water, under relatively high pressure, is fed by way of an upper pipe 153 to the first venturi 148. Before the first venturi 148, a branch pipe 154 from the upper pipe 153 carries a high pressure clear water supply to a first inlet 155 to the boss 199. The first venturi 148 passes an attenuated, low pressure supply by way of a pipe 156 to the second venturi 149, and produces a suction flow in a side pipe 157 which leads from an outlet 158 in the boss 199. The second venturi 149 returns the water supply to the upper tank 145 by way of a return pipe 159 and provides a relatively low level suction flow in a second branch pipe 160 which leads from an outlet port 161 in the lower tank 190. The output of the pump 147 is also led through a lower supply pipe 162 and a constriction 163 to a low pressure input port 164 in the boss 131. The outlet pipe 150 from the upper tank 145 also supplies a flow of seed suspension to a port 165 in the lower tank 190 by way of a supply pipe 166 which bypasses the filter 151. Finally, a high water pressure supply is fed to an inlet 167 in the boss 131 by way of a supply pipe 168 leading from a water header tank 146.

The manner of operation of the embodiment of FIGS. 12, 13 and 14 will now be described. The second disc 194 is rotated by a gear (not shown) meshing with the outside of the edge rim of the ring 198, and the inner disc 197 is rotated by virtue of the engagement of the probes 191 with the pockets 140. In FIG. 12, the embodiment is shown with the discs rotating in a clockwise direction. Considering the cycle for an individual probe 191, as the probe rises on the left-hand side of FIG. 13 and passes across the top part of its travel, it is free from the pocket 140 and passes through the seed and water suspension in the chamber 190. During this part of its travel, the probe 191 is connected by way of its associated channels 139 and 138 and 173 to the suction inlet 158 in the boss 199. During this period of its cycle, the probe 191 captures a seed at its capture orifice 192 and carries a seed round with it. As the probe 191 passes into the bottom third of its travel, it engages a pocket 140 and at the bottom of its travel, as shown in FIG. 14, the probe 191 holds the seed in the inclined portion 141 of the delivery conduit 143. At this point, the bore 139 of the probe 191 is disconnected from the suction inlet 158 in the boss 199 and is connected for a short time interval in the high pressure inlet 155 in the boss 199. At the same time, the delivery conduit 143 in the disc 194 is connected by way of its passageway 144 to the high pressure supply port 167 in the boss 131. These connections cause the seed to be released from the capture orifice 192 and to be swept out of the opening 142 in the housing 196 by the flow from 143. Immediately after the release of the seed, as the probe 191 moves away from its bottom position, the delivery conduit 143 is disconnected from the high pressure inlet 167 in the boss 131 and is connected instead to a low pressure inlet 164 in the boss 131, and remains so connected throughout the rotation of the disc 194 until the pocket 140 concerned returns to its bottom position. The effect of this connection is that, as the pocket rises on the left-hand side of the FIG. 13 and the probe 191 recedes from the pocket 140, a small positive flow of clear water from the delivery conduit 143 into the tank 190 forms a water barrier which prevents unwanted seeds passing into the pocket 140.

Also as the probe 191 moves away from its bottom position, changes of couplings occur at the boss 199. The bore 73 of the probe concerned is disconnected from the high pressure inlet 155 and is re-connected to the suction inlet 158 so that when the probe 191 is withdrawn from the pocket 140 it can capture a further seed from the water suspension.

Thus, for most of the path of rotation of a probe 191 and a pocket 140, the pressure in the bore 139 of the probe is arranged to be substantially below the pressure in the tank 190, while the pressure in the delivery conduit 143 of the pocket is arranged to be slightly above the pressure in the tank 190. During this portion of a period of rotation, the inclined portion 141 of the delivery conduit 143 is closed off from the opening 142 by means of the side of the housing 196 so that there is no loss of water from the tank 146 nor from the tank 190. The high pressure inlets 155 and 167 are only connected to a probe 191 and a conduit 143 for a short time interval at the bottom position. At such a moment, very little high pressure water from the inlet 167 can pass into the tank 190 as the probe 191 forms a nearly sealing fit with the pocket 140 and the direction of the high pressure jet is towards the opening 142 which is open to the atmosphere.

The embodiment described with reference to FIGS. 12, 13 and 14 has a number of advantages. The engagement and dis-engagement of the probe with the pocket can be made to operate relatively slowly while allowing rapid dispensation of seeds by virtue of the large number of probes rotating on the disc. Furthermore, the flat disc-like arrangement of the whole apparatus allows close spacing of the seed outlets which is an advantage when forming a bank of seed dispensing devices on a seed drill for use in the field.

Referring to FIGS. 15 and 16, there is shown a modification of the apparatus of FIGS. 12, 13 and 14 to provide a pair of first discs 187 and 187' fed from a single central boss and co-operating with a pair of outer rings 188 and 188'. In FIG. 16, elements on the left side corresponding to elements on the right side are indicated by like but dashed reference numerals.

Referring to FIG. 16, a housing 186 defines a tank 180 for containing a suspension of seeds and water. Within the tank 180 is provided a central support 174 on which are mounted, back to back, a pair of hubs 189 and 189' which support discs 187 and 187'. The tank 180 also houses the pair of rings 188 and 188' which, in this embodiment, are not supported by discs corresponding to the disc 194 in FIG. 2, but are supported in nylon sealing rings 170 and 170' which locate the rings 188 and 188' in the housing for rotation by a drive shaft 171 and gearing 172.

As in the case of FIG. 12, the suction and pressure supplies are made to the discs 187 and 187' through the hubs 189 and 189', by way of passageways 177 and 178 leading from a suction supply pipe 175 and a high pressure supply pipe 176 by way of grooves 182 and 183 in the hubs 189 and 189'. The high pressure supply required by the rings 188 and 188' is supplied by an inlet pipe 168 passing through the base of the nylon sealing rings 170 and 170' and the housing 186. The supply line 168 operates to sweep the seeds to be dispensed from probes 181 and 181' on the discs 187 and 187'. The seed and water suspension is fed into the tank 180 through an inlet pipe 166 and is evacuated back to a storage reservoir (not shown but corresponding to the reservoir in FIG. 5) by way of a seed suspension outlet 161. The height of the support member 169 can be adjusted for different seed sizes.

The seed outlet of the embodiments described may conveniently be positioned above a seed drill unit which would fit a coulter and tool frame so that the seed is dropped into a furrow in the seed bed produced by the furrow opener or coulter.

It will be appreciatated that the embodiments of the invention described allow a control over the frequency of dispensing of seeds, by varying the rate of rotation of the rotor in FIGS. 5, 12 and 15. Thus, in conjunction with the speed of forward travel of the seed drill, the spacing of the seeds may be accurately controlled and/or monitored.

Figure 19:
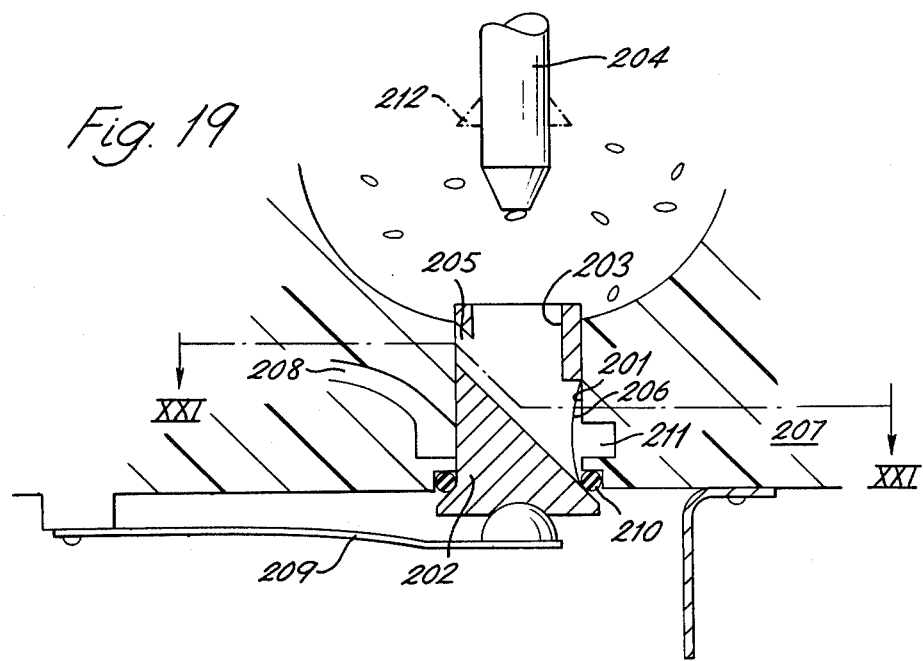
Figure 20:
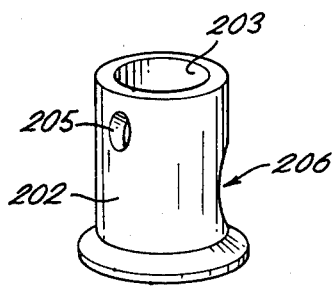
FIG. 20 is a perspective view of a door element shown in FIGS. 17, 18 and 19.
Figure 21:
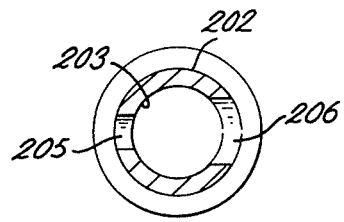
FIG. 21 is a section of the door element along lines XXI—XXI in FIG. 19.

In those embodiments of the dispensing apparatus in which the probe moves towards an outlet orifice, for example as described with reference to FIGS. 1 to 4 and 13 to 16, it may be useful to provide a door to prevent seeds from leaving the seed chamber at random. This may be in addition to or in place of a flow of liquid into the seed chamber through the outlet port such as has been described with reference to previous embodiments. In FIGS. 17 to 21 there is shown in diagrammatic form one form of such a door. FIGS. 17 and 18 and 19 show three stages of operation of the door, FIG. 20 shows a perspective view of the door element and FIG. 21 shows a section through the door element along the line 20—20 in FIG. 19.

In FIGS. 17 to 19 a seed chamber 200 contains the seed and water suspension and has an outlet port 201, in the form of a cylindrical passageway. Within the outlet port 201 is a door element 202 having an upper opening 203 in register with a probe 204 in the seed chamber 200. The door element 202 has two side openings 205 and 206 generally opposite each other as shown in FIGS. 21 and 20. The seed chamber 200 is formed in a housing 207 through which runs a conduit 208 for providing a flow for ejecting a captured seed from the end of the probe 204. In its normal rest position shown in FIG. 17, the door element 202 is biassed upwardly by a spring 209 and seals against a flexible ring seal 210 around the base of the outlet port 201.

Starting from the position shown in FIG. 19, the probe 204 is withdrawn into the seed chamber 200 and captures a seed on the capture orifice of the end of the probe 204. During this time, water flows along the conduit 208, around a groove 211 in the housing 207, and up through the door element 202 into the seed chamber 200.

The next phase of the cycle is shown in FIG. 17 when the probe 204 is lowered until laterally extending wings 212 engage the top of the door element 202. This is the normal rest position for the apparatus. The function of the flow around the groove 211 and up into the seed chamber is both to stop seeds getting trapped in the door element 202 and to clear unwanted seeds from the end of the probe 204.

The final stage of operation is shown in FIG. 18 which shows the probe after it has been lowered further and has pushed the door element 202 against the spring 209 to an eject position shown. In this position, the side opening 205 of the door element 202 is in register with the end of the conduit 208, and the side opening 206 is clear of the outlet port 201. At this stage, the pressure in the probe 204 is reversed, so that the seed is released from the capture orifice, and the flow through the conduit 208 carries the seed through the opening 206 for planting or other use.

In embodiments of the invention, suitable valves for supplying one or more units with water at the correct pressures can be mechanical or can be fluidic. For example, mechanical valves can be driven by the seed drill land wheels, or fluidic valves can be triggered at short intervals by these wheels.

Although the seed dispensing apparatus of the invention has been described with reference to mobile seed drills, it will be appreciated that the apparatus can be utilized equally well in a stationary seed dispensing apparatus, for example in a soil block machine for horticultural purposes.

As has been mentioned, a number of advantages arise from the drilling of seeds in a wet state. It is possible to germinate seed under ideal conditions before sowing it, thus producing a faster and more evenly emerging crop.

When the seeds are germinating, it is possible to treat them in various ways while they are in a receptive state. By embodiments of the invention as described hereinbefore, it is possible to sow seed in muddy conditions, and even with suitable arrangements under water. Furthermore, some seeds, such as those of lettuce, are damaged when sown in a dry state by conventional methods. The use of the fluid drill according to the invention is much more gentle with such seeds.

I claim:

1. Apparatus for dispensing discrete objects from a liquid comprising:
   a suspension container for containing discrete objects in suspension in a liquid,
   a capture element at least partially disposed within said suspension container, defining a capture orifice disposed within said suspension container during at least part of the operation of the apparatus and providing an exit for liquid from the container, said capture element being adapted to capture a number of the discrete objects against the orifice thereof by means of a pressure difference across the orifice,
   transfer means for producing relative movement between the capture orifice and the objects in suspension in the liquid in such a manner as to have the capture orifice, after capture of an object or objects, situated in a region free from objects suspended in the liquid,
   flow means for producing a flow of liquid past the capture orifice such as to sweep away excess objects attracted to the capture orifice by the said pressure difference,
   an outlet port in said suspension container for the exit of objects from the container, and
   removal means for removing a captured object or objects from the capture orifice for dispensing the object or objects.

2. Apparatus according to claim 1 in which the capture orifice has an aperture size relative to the objects to be dispensed such that in normal operation one object at a time is captured on the capture orifice.

3. Apparatus according to claim 1 in which the capture orifice is arranged to be submerged in liquid throughout normal operation.

4. Apparatus according to claim 1 in which the removal means includes means for releasing temporarily a pressure difference holding the object or objects against the capture orifice.

5. Apparatus according to claim 1 in which the transfer means comprises means for moving the capture orifice relative to the container to a region which in operation is free from objects suspended in the liquid.

6. Apparatus according to claim 5 in which the transfer means comprises means for moving the capture orifice through said outlet port in the container to a region outside the container free from objects suspended in the liquid.

7. Apparatus according to claim 6 in which the removal means includes means for providing a flow of liquid outside the container past the outlet port for moving the captured object or objcts away from the outlet port after release from the capture orifice.

8. Apparatus according to claim 5 in which the transfer means includes a rotor for moving the capture element through the liquid by sweeping the capture orifice along an at least part circular path.

9. Apparatus according to claim 5, including a plurality of capture elements movable by the transfer means and each defining a capture orifice.

10. Apparatus according to claim 5 further comprising a first rotary member, a second rotary member, a plurality of capture orifices mounted around a circumferential region of said first rotary member and a plurality of outlet ports mounted around a circumferential region of said second rotary member, the two rotary members being so positioned that the said two circumferential regions abut one another over a portion of the length of each and are spaced apart from each other over a portion of the length of each, the rotary members being arranged to rotate in co-operation with each other in such a manner that each capture orifice during part of the period of rotation is spaced from the outlet ports and is arranged to capture a seed from the suspension, and each capture orifice during another part of its period of rotation is brought into proximity with an outlet port and is arranged to transfer the seed from the capture orifice through the outlet port.

11. Apparatus according to claim 10 in which the first and second rotary members are so arranged that the said circumferential region of one of the rotary members lies within the said circumferential region of the other rotary member, the circumference of the inner circumferential region being of smaller length than the circumference of the outer circumferential region and the axes of the two rotary members being spaced apart.

12. Apparatus according to claim 1 in which the transfer means comprises means for producing a flow of liquid in the container to produce the said relative movement between the capture orifice and the objects in suspension by moving the objects relative to the container.

13. Apparatus according to claim 12 in which the said flow means for producing the flow of liquid for sweeping away excess objects is constituted by at least part of the transfer means.

14. Apparatus according to claim 12 in which the removal means for removing the captured object or objects from the capture orifice comprises means for producing a flow of liquid in the container for carrying the object or objects from the capture orifice through the outlet port.

15. Apparatus according to claim 1 in which the container has an outlet port for dispensing captured objects, and including inflow means for providing an inflow of liquid through the outlet port into the container sufficient to prevent escape through the outlet port of discrete objects other than those transferred from the capture orifice by the said transfer means.

16. Apparatus according to claim 15 in which the said flow means for sweeping away excess objects from the capture orifice is constituted by the said inflow means for providing an inflow of liquid through the outlet port.

17. Apparatus according to claim 15 in which the inflow means comprises a chamber or conduit communicating with the outlet port of the suspension container and adapted to contain liquid at a pressure above the pressure in the suspension container with a pressure difference sufficient to provide the required inflow of liquid through the outlet port into the suspension container.

18. Apparatus according to claim 15 in which the inflow means includes a delivery conduit communicating with the suspension container through the said outlet port, and means for providing a flow of liquid along the delivery conduit past the outlet port, the arrangement of the outlet port and the delivery conduit in operation being such as to effect passage of a minor proportion of the liquid in the delivery conduit into the suspension chamber through the outlet port, the remainder of the liquid in the delivery conduit being arranged to carry along the delivery conduit objects which have been transferred through the outlet port.

19. Apparatus according to claim 1 in which the capture element comprises a hollow tubular member through which liquid may flow out of the suspension container, the capture orifice being defined at an end of the tubular member which is situated within the suspension container during capture of an object.

20. Apparatus for dispensing discrete objects from a liquid comprising:
a suspension container for containing discrete objects in suspension in a liquid;
a capture element at least partially disposed within said suspension container, defining a capture orifice disposed within said suspension container during at least part of the operation of the apparatus and providing an exit for liquid from the container, said capture element being adapted to capture a number of the discrete objects against the orifice thereof by means of a pressure difference across the orifice, the capture orifice being arranged to be submerged in liquid throughout normal operation;
transfer means for producing relative movement between the capture orifice and the objects in suspension in the liquid in such a manner as to have the capture orifice after capture of an object or objects situated in a region free from objects suspended in the liquid;
flow means for producing a flow of liquid past the capture orifice such as to sweep away excess objects attracted to the capture orifice by the said pressure difference;
an outlet port in said suspension container for the exit of objects from the container;
inflow means for providing an inflow of liquid through the outlet port into the container sufficient to prevent random escape through the outlet port of discrete objects other than those to be dispensed; and
removal means for removing a captured object or objects from the capture orifice for dispensing the object or objects.

21. Apparatus according to claim 20 in which the transfer means comprises means for moving the capture orifice through said outlet port in the container to a region outside the container free from objects suspended in the liquid, and the removal means includes means for releasing temporarily a pressure difference holding the object or objects against the capture orifice, and means for providing a flow of liquid outside the container past the outlet port for moving the captured object or objects away from the outlet port after release from the capture orifice.

22. Apparatus according to claim 20 in which the transfer means comprises means for producing a flow of liquid in the container to produce the said relative movement between the capture orifice and the objects in suspension by moving the objects relative to the container, the said flow means for producing the flow of liquid for sweeping away excess objects being constituted by the transfer means or part thereof, and the removal means for removing the captured object or objects from the capture orifice comprising means for producing a flow of liquid in the container for carrying the object or objects from the capture orifice through the outlet port.

23. A method of dispensing discrete objects from a liquid comprising:
dispersing discrete objects in suspension in a liquid in a container having an outlet port for the exit of objects from the container,
capturing a number of the discrete objects against a capture orifice by applying across the capture orifice a pressure difference in a sense each as to cause exit of liquid from the container through the capture orifice,
producing relative movement between the capture orifice and the objects in suspension in the liquid in such a manner as to have the capture orifice situated in a region free from objects suspended in the liquid, and producing a flow of liquid past the capture orifice such as to sweep away excess objects attracted to the capture orifice by the said pressure difference, and removing a captured object or objects from the capture orifice at a required region for dispensing the object or objects.

24. A method according to claim 23 in which the capture orifice remains submerged in liquid throughout all the steps specified.

25. A method according to claim 23 in which the step of removing a captured object or objects from the capture orifice includes releasing temporarily the pressure difference holding the object or objects against the capture orifice.

26. A method according to claim 23 in which the step of producing relative movement between the capture orifice and the objects in suspension comprises moving the capture orifice relative to the container to a region free from objects suspended in the liquid.

27. A method according to claim 26 including the step of moving the capture orifice through an outlet port in the container to a region outside the container free from objects suspended in the liquid.

28. A method according to claim 27 including the step of providing a flow of liquid outside the container past the outlet port for moving the captured object or objects away from the outlet port after release from the capture orifice.

29. A method according to claim 23 in which the step of producing relative movement between the capture orifice and the objects in suspension comprises producing a flow of liquid in the container to produce the said relative movement by moving the objects relative to the container.

30. A method according to claim 29 in which the said flow of liquid for producing the said relative movement between the capture orifice and the objects in suspension is also used to sweep away the excess objects from the capture orifice.

31. A method according to claim 29 including the step of transferring the captured object or objects from the capture orifice through said outlet port of the container by producing a flow of liquid in the container which carries the object or objects from the capture orifice through said outlet port.

32. A method according to claim 23 including a step of transferring the captured object or objects through said outlet port in the container, and including flowing liquid through said outlet port into the container in such a manner as to prevent objects in suspension in the liquid in the container from passing at random out of said outlet port.

33. A method according to claim 32 in which the said flow of liquid through the outlet port into the container is used to sweep away excess objects from the capture orifice.

34. A method according to claim 23 in which the capture orifice has an aperture size relative to the objects to be dispensed such that in normal operation one object at a time is captured on the capture orifice.

* * * * *